(12) United States Patent
Bornschlegl

(10) Patent No.: US 11,499,003 B2
(45) Date of Patent: Nov. 15, 2022

(54) MULTI-COMPONENT EPOXY RESIN COMPOUND WITH LEAKAGE INDICATOR, AND CURING COMPONENT FOR THE EPOXY RESIN COMPOUND

(71) Applicant: Hilti Aktiengesellschaft, Schaan (LI)

(72) Inventor: Alexander Bornschlegl, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/754,888

(22) PCT Filed: Nov. 12, 2018

(86) PCT No.: PCT/EP2018/080942
§ 371 (c)(1),
(2) Date: Apr. 9, 2020

(87) PCT Pub. No.: WO2019/101563
PCT Pub. Date: May 31, 2019

(65) Prior Publication Data
US 2021/0198418 A1    Jul. 1, 2021

(30) Foreign Application Priority Data

Nov. 23, 2017 (EP) .................................. 17203258

(51) Int. Cl.
*C08G 59/50* (2006.01)
*C04B 26/16* (2006.01)
(Continued)

(52) U.S. Cl.
CPC .......... *C08G 59/5006* (2013.01); *C04B 26/14* (2013.01); *C04B 40/065* (2013.01);
(Continued)

(58) Field of Classification Search
CPC ............ C08G 59/5006; C08G 59/5026; C08G 59/5073; C08G 59/54; C08G 59/56;
(Continued)

(56) References Cited

U.S. PATENT DOCUMENTS 4,221,890 A * 9/1980 Dimmick ................ C04B 41/63
528/93
5,338,568 A * 8/1994 Lohnes ................ C04B 41/009
427/136
(Continued)

FOREIGN PATENT DOCUMENTS

| CN | 106674900 | 5/2017 |
| EP | 1 118 628 | 7/2001 |
| RU | 2 237 695 | 10/2004 |

OTHER PUBLICATIONS

International Search Report dated Jan. 31, 2019 in PCT/EP2018/080942 with English translation, 5 pages.
(Continued)

*Primary Examiner* — David T Karst
(74) *Attorney, Agent, or Firm* — Grüneberg and Myers PLLC

(57) ABSTRACT

A curing composition is useful for a multi-component epoxy resin compound and includes at least one first polyamine, at least one second polyamine, and at least one polyphenol from the group of bisphenols and novolac resins as an accelerator. Upon contact with atmospheric oxygen, the curing composition discolors within a few days and therefore leakages can be visually identified.

12 Claims, 9 Drawing Sheets

(51) Int. Cl.
  *C04B 40/06*   (2006.01)
  *C08G 59/54*   (2006.01)
  *C08G 59/56*   (2006.01)
  *C08G 59/62*   (2006.01)
  *C08L 63/04*   (2006.01)
  *C04B 26/14*   (2006.01)

(52) U.S. Cl.
  CPC ..... *C08G 59/5026* (2013.01); *C08G 59/5073* (2013.01); *C08G 59/54* (2013.01); *C08G 59/56* (2013.01); *C08G 59/621* (2013.01); *C08L 63/04* (2013.01)

(58) Field of Classification Search
  CPC ..... C08G 59/621; C04B 26/14; C04B 40/065; C08L 63/04
  USPC ....................................................... 525/113
  See application file for complete search history.

(56) References Cited

U.S. PATENT DOCUMENTS

| | | |
|---|---|---|
| 6,645,340 B2 | 11/2003 | Gienau et al. |
| 2001/0035111 A1 | 11/2001 | Gienau et al. |
| 2016/0159690 A1 | 6/2016 | Dureault et al. |

OTHER PUBLICATIONS

Written Opinion dated Jan. 31, 2019 in PCT/EP2018/080942 with English translation, 8 pages.

\* cited by examiner

MULTI-COMPONENT EPOXY RESIN COMPOUND WITH LEAKAGE INDICATOR, AND CURING COMPONENT FOR THE EPOXY RESIN COMPOUND

CROSS-REFERENCE TO RELATED APPLICATIONS

This application is a National Stage entry under § 371 of International Application No. PCT/EP2018/080942, filed on Nov. 12, 2018, and which claims the benefit of European Application No. 17203258.3, filed on Nov. 23, 2017, both of which are incorporated by reference in their entireties.

BACKGROUND OF THE INVENTION

Field of the Invention

The invention relates to a multi-component epoxy resin compound and to a curing component for the epoxy resin compound having a leakage indicator. The invention further relates to the use of a mixture of polyamines in a curing component for the epoxy resin compound.

Discussion of the Background

Multi-component mortar compounds based on curable epoxy resins and amine curing agents have been known for some time and are used as adhesives, spackling pastes for repairing cracks and chemical anchors for fastening construction elements such as anchor rods, reinforcing bars, and screws in boreholes of various substrates.

During the production of multi-component mortar systems, the containers may leak due to the manufacturing process. In the case of film containers there may be tears or other injuries to the film, for example, or there can be leakage due to incomplete film closure, in the case of hard cartridge systems there Is also the possibility of production-related leaks, for example due to cracks or fractures in the hard cartridge wall or due to damaged sealing lips of the sealing plugs. Leakages of the curing component in particular can lead to danger to people and goods in various ways.

The resilience of a cured multi-component mortar system depends, inter alia, on the mixing ratio and the mixing quality of the binder and curing components. Since multi-component mortar systems are pressed out based on volume, a leak upstream of the mixing element, for example a tear on the foil bag of the curing component, leads to a mixing ratio that deviates from the target and, in extreme cases, to a reduced load capacity of the cured system.

A leak upstream of the mixing element can also result in a pressure loss in the affected side during the pressing-out of the components. This can also lead to reduced mixing quality and a non-ideal composition of the mixed mortar.

Since the curing component can contain harmful components such as polyamines, there is a risk that leaked curing agent will endanger the user of the product if he does not wear personal protective equipment when using the multi-component mortar.

For these reasons, it is therefore desirable to Identify leaking containers before delivery by the manufacturer or at the latest shortly before application by the user.

As part of production control and monitoring, defective containers can be identified using various measures. However, these measures are disadvantageous for several reasons.

As part of the image recognition process, a line or area camera captures the packaging, and the connected image evaluation software recognizes the crack itself or the leaked curing agent. However, complete 360° detection of the containers is technically complex. Small cracks are often not identifiable as such due to the printing on the packaging, especially if no curing agent has leaked.

In spectroscopic methods in which an optical scanning device with sensitivity in the invisible range of the electromagnetic spectrum, such as infrared or ultraviolet, is used, leaked curing agent can be identified on the basis of characteristic spectroscopic features such as vibration bands, absorption bands or on the basis of an added indicator. However, since only a few minutes pass between filling the container and the packaging control, the thickened curing agent filled with inorganic fillers such as sand, quartz powder or cement has only insufficient time to emerge from the crack. Therefore, only large cracks are identified at which a large amount of curing agent has already leaked after a short time. The addition of an indicator to the curing component also increases the cost of the formulation. In addition, carrying out production control using spectroscopic methods requires complex equipment on the production line and increases running costs.

There is therefore still a need for an option for identifying defective containers in which the cracks are visible to the human eye.

EP 2 826 796 A1 describes the use of a curing composition for multi-component mortar compounds based on epoxy amine for the chemical fastening of structural elements. The multi-component mortar compound comprises an epoxy resin component (A), which contains at least one epoxy resin and optionally at least one reactive diluent as a curable compound, and a curing component (B), which contains a hybrid curing agent, the epoxy resin component (A) and/or the curing component (B) may optionally contain further constituents selected from inorganic and/or organic compounds. The hybrid curing agent is a mixture of at least one aliphatic, alicyclic or aromatic amine as a curing agent and a novolac resin as an accelerator. The use of the hybrid curing agent should lead to a rapid curing of the multi-component mortar compound even at low temperatures with complete hardening of the mortar compound.

EP 1 040 150 B1 also discloses the use of novolac resins in epoxy curing agents. The novolac resins are used as accelerators in a concentration of from 1 to 25 wt. % in the curing mixture.

EP 1 838 750 B2 discloses a mixture of polyamines and novolac resin in a concentration of from 30 to 45 wt. %, based on the curing component.

Such curing compositions, in combination with epoxy-based binder components, are characterized by high bond strength when used as chemical anchors. The curing compositions are typically slightly yellow to colorless and change color slowly over the course of a few weeks in the presence of atmospheric oxygen. This discoloration is dearly too slow to be able to carry out a visual check before the mortar compounds are delivered.

SUMMARY OF THE INVENTION

The object of the present invention is to provide a formulation for a curing component based on amines for the curing of epoxy resins or other synthetic resin mixtures which are curable with amines, which, after contact with atmospheric oxygen at room temperature, exhibits a clear visual change in color in the visible range of the electromagnetic spectrum within a few days.

The curing composition should not show any loss of performance compared to a reference composition suitable for multi-component mortar systems and should inherently show the change in color without the addition of special indicators. In addition, the curing composition should be compatible with various accelerators which are usually used in epoxy-amine systems.

The problem addressed by the invention is solved by providing a curing composition according to an embodiment. Preferred embodiments of the curing composition according to the invention are provided in the dependent claims, which may optionally be combined with one another.

The invention also relates to a multi-component epoxy resin compound according to another embodiment.

The invention also relates to the use of a mixture of a polyphenol and a first and a second polyamine according to yet another embodiment for detecting leaks in a curing composition according to the invention, the curing composition discoloring within a few days upon contact with atmospheric oxygen.

Preferred embodiments of the epoxy resin compound according to the invention are provided in the dependent claims, which may optionally be combined with one another, According to the invention, a curing composition for a multi-component epoxy resin compound is provided, comprising at least one first polyamine and a second polyamine, and at least one novolac resin as an accelerator and optionally a co-accelerator.

The first polyamine corresponds to the following general formula (I):

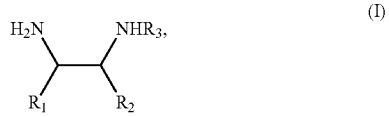

in which
R₁ and R₂ denote, independently of one another, —H or —CH₃, or together denote an optionally substituted, preferably alkyl-substituted, C₃ to C₈ hydrocarbon chain which is connected to form a cycle, and
R₃ denotes —H, CH₃, —CH₂—CH₂—NH₂ or —CH₂—CH₂—NH—CH₂—CH₂—NH₂.

The second polyamine corresponds to the following general formula (II) or (III):

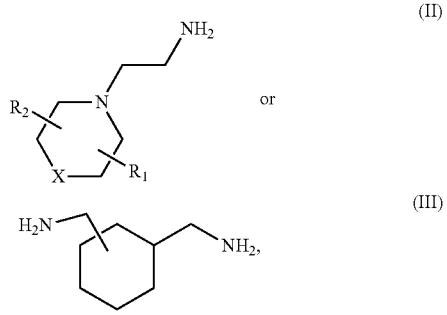

in which
R₁ and R₂ denote, independently of one another, H or —CH₃, and
X denotes NH, O or S.

The curing composition according to the invention shows the desired visual discoloration, which occurs only in atmospheric oxygen and can already be seen after a few days.

The bond strength achieved with the curing compositions according to the invention in fully formulated two-component or multi-component mortar systems are at the same level as the bond strength of reference compounds, which show no discoloration when atmospheric oxygen enters the curing component.

Surprisingly, it was found that when a novolac resin is combined with the above-mentioned polyamines, in particular DCH (1,2-diaminocyclohexane) as the first polyamine and 1,3-BAC (1,3-bis(aminomethyl)cyclohexane) as the second polyamine, a synergistic effect is achieved and a visible discoloration of the curing component can be achieved within a much shorter time than in curing components that use other amines and amine mixtures.

It is known that amines in general, and in particular products containing the amine DCH, tend to discolor upon contact with atmospheric oxygen and light. However, the inventors were able to show that only the targeted selection of the above-mentioned amines from the group of the first and second polyamines in combination with one another leads to the desired rapid discoloration upon contact with atmospheric oxygen, preferably within a few hours to days. In contrast, curing compositions that are not according to the invention with DCH alone or in combination with amines other than the above-mentioned amines from the group of the second polyamines show no discoloration within the desired period of time.

The desired behavior was observed only when the first polyamine, in particular DCH, was combined with the amines from the group of the second polyamines, in particular 1,3-BAC and/or aminoethylpiperazine (AEP).

The inventors have further found that the addition of other substances typically used in curing compositions for epoxy compounds, such as, for example, further amines, accelerators, silanes and/or phenolic components, does not impair the effect of the rapid discoloration of the composition.

DESCRIPTION OF PREFERRED EMBODIMENTS

According to a preferred embodiment of the curing composition according to the invention, the first polyamine is selected from the group consisting of 1,2-diaminocyclohexane, 1,2-diaminocyclohexen, diethylenetriamine (DETA) and triethylenetetramine (TETA), and combinations thereof. The second polyamine is preferably selected from the group consisting of 1,3-bis(aminomethyl)cyclohexane and aminoethylpiperazine.

According to a further preferred embodiment, the first polyamine is present in a proportion of from 1 to 50 wt. %, based on the weight of the organic parts of the curing composition, i.e. the weight of the curing composition without inorganic additives, preferably in a proportion of from 5 to 30 wt. %, particularly preferably in a proportion of from 5 to 20 wt. %.

The second polyamine is present in the curing composition in a proportion of from 1 to 50 wt. %, based on the weight of the organic parts of the curing composition, preferably in a proportion of from 15 to 50 wt. %, particularly preferably in a proportion of from 25 to 35 wt. %.

The polyphenol is present in the curing composition in a proportion of from 1 to 40 wt. %, based on the weight of the organic parts of the curing composition, preferably in a proportion of from 12 to 27 wt. %, particularly preferably in a proportion of from 16 to 22 wt. %. The amount of polyphenol should not exceed 40 wt. % in order to obtain a liquid curing component at room temperature which has sufficiently low viscosity even at low temperatures, and in order not to negatively influence the squeezing properties of the curing component, if the proportion of polyphenol in the curing component is less than 1 wt. %, an acceleration of the epoxy curing can hardly be observed and the positive effect of the polyphenol on the curing of the epoxy resin compound at temperatures below +10° C. is hardly noticeable.

According to another preferred embodiment of the curing composition, the polyphenol comprises a novolac resin, more preferably a novolac resin which corresponds to the following formula (IV):

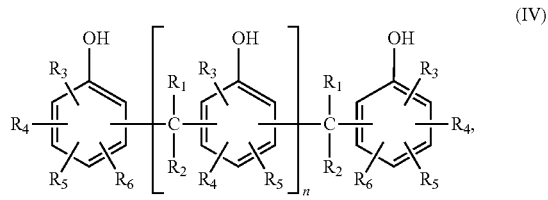

(IV)

in which
R$_1$ and R$_2$ each represent, independently of one another, H or —CH$_3$;
R$_3$, R$_4$, R$_5$ and R$_6$ each represent, independently of one another, H, —CH$_3$ or an aliphatic functional group, preferably a linear, optionally partially unsaturated, unbranched hydrocarbon chain having up to 18 carbon atoms, preferably —C$_{15}$H$_{31}$, or an alkaryl functional group, preferably —C$_8$H$_9$; and where
n is 0 to 20, preferably 0 to 6.

Novolac resins are obtained by acidic condensation of unsubstituted phenol or substituted phenol derivatives with an aldehyde, especially formaldehyde, the aldehyde/phenol ratio being less than 1:1.

Preferably, the novolac resin corresponds to the following formula (V):

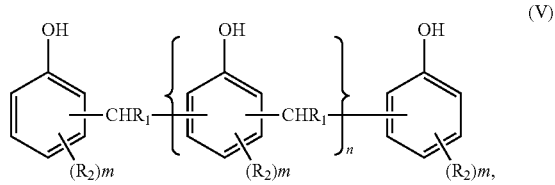

(V)

in which
R$_1$ denotes H,
R$_2$ denotes C$_1$-C$_{10}$ alkyl, preferably a methyl functional group,
m is 0, 1 or 2, and is preferably 1, and
n is 0 to 20, preferably 0 to 15, and particularly preferably 0 to 6.

According to another preferred embodiment of the curing composition, the polyphenol comprises a bisphenol selected from the group of bisphenol A and bisphenol F, either alone or together with the above-mentioned novolac resin.

In addition to the above-mentioned curing agents from the group of the first and second polyamines, the curing composition can include further curing agents, which are different from the first and second polyamines, from the group of mono- and/or polyamines and/or further curing agents from the group of Mannich bases, polyamidoamines or phenalkamines.

The amines suitable as further curing agents for the epoxy resin in multi-component mortar compounds are known to a person skilled in the art. In particular, the amines are selected from the group consisting of aliphatic, alicyclic, aromatic and araliphatic amines, the amine having on average at least two reactive hydrogen atoms, bonded to one nitrogen atom, per molecule. This also includes polyamines having at least two amino groups in the molecule.

The amine used as a further curing agent is preferably selected from the group of the unbranched or branched C$_2$-C$_{10}$ alkyl diamines, the C$_2$-C$_{10}$ polyalkylene polyamines and the aromatic and araliphatic amines which preferably contain a substituted or unsubstituted benzene ring.

Laurylamine is preferred as the monoamine.

The alkyl diamines are preferably selected from 2,2,4- or 2,4,4-trimethyl-1,6-diaminohexane and mixtures thereof (TMD), 1-amino-3-aminomethyl-3,5,5-trimethylcyclohexane (IPDA), 2-methyl-1,5-pentanediamine (DYTEK A), (3(4),8(9)bis(aminomethyl)dicyclo[5.2.1.02,6]decane and isomer mixtures thereof (TCD-diamine), aminomethyltricyclo[5.2.1.02,6]decane and isomer mixtures thereof (TCD-amine) and 1,6-hexamethylene diamine.

The polyalkylene polyamines are preferably selected from tetraethylene pentamine (TEPA) and pentaethylene hexamine (PEHA).

The aromatic polyamines are preferably selected from diethylmethylbenzenediamine and 4,4'-sulfonyldianilines and the araliphatic polyamines are preferably selected from 1,3-benzenedimethanamine (mXDA) and 1,4-benzenedimethanamine (pXDA) and N,N'-dimethyl-1,3-benzenedimethanamine.

Other amines suitable as curing agents for epoxy resins are, for example, 1,2-diaminoethane (ethylenediamine), 1,3-propanediamine, 1,4-diaminobutane, 2,2-dimethyl-1,3-propanediamine(neopentanediamine), diethylaminopropylamine (DEAPA), 2-methyl-1,5-diaminopentane, 1,3-diaminopentane, 1-amino-3-aminomethyl-3,5,5-trimethylcyclohexane, hexamethylene diamine (HMD), bis(4-aminocyclohexyl)methane, bis(4-amino-3-methylcyclohexyl) methane, 4-azaheptane-1,7-diamine, 1,11-diamino-3,6,9-trioxundecane, 1,8-diamino-3,6-dioxaoctane, 1,5-diaminomethyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis-(3-aminopropyl)methylamine, bis(4-amino-3-methylcyclohexyl)methane, 5-(aminomethyl) bicyclo[[2.2.1]hept-2-yl]methylamine (NBDA, norbornanediamine), dimethyldipropylenetriamine, dimethylaminopropylaminopropylamine (DMAPAPA), diaminodicyclohexylmethane (PACM), mixed polycyclic amines (MPCA) such as Ancamine® 2168, dimethyldiaminodicyclohexylmethane (Laromin® C260).

In a further embodiment, the curing composition comprises further additives from the group of thinners, solvents, further accelerators, adhesion promoters and inorganic fillers.

Non-reactive diluents (solvents) may preferably be contained in amount of up to 30 wt. %, based on the total weight of the curing composition, for example from 1 to 20 wt. %.

Examples of suitable solvents are lower alkyl ketones such as acetone, di lower alkyl lower alkanoyl amides such as dimethylacetamide, lower alkyl benzenes such as xylenes or toluene, phthalic acid esters or paraffins. The curing composition is preferably free from solvents.

By using an adhesion promoter, the cross-linking of the borehole wall with the mortar compound is improved such that the adhesion increases in the cured state. Suitable adhesion promoters are selected from the group of silanes that are functionalized with further reactive organic groups, such as 3-glycidoxypropyltrimethoxysilane, 3-glycidoxypropyltriethoxysilane, 2-(3,4-epoxycyclohexyl)ethyltrimethoxysilane, N-2-(aminoethyl)-3-aminopropylmethyldiethoxysilane, N-2-(aminoethyl)-3-aminopropyltriethoxysilane, 3-aminopropyl-trimethoxysilane, 3-aminopropyl-triethoxysilane, N-phenyl-3-aminoethyl-3-aminopropyl-trimethoxysilane, 3-mercaptopropyltrimethoxysilane and 3-mercaptopropylmethyldimethoxysilane. In particular 3-aminopropyltrimethoxysilane (AMMO), 3-aminopropyl-triethoxysilane (AMEO), 2-aminoethyl-3-aminopropylt-rimethoxysilane (DAMO) and trimethoxysilylpropyldiethylenetetramine (TRIAMO) are preferred as adhesion promoters.

The adhesion promoter may be contained in an amount of up to 10 wt. %, preferably from 0.1 to 5 wt. %, based on the total weight of the curing composition.

Inorganic fillers, in particular cements such as Portland cement or aluminate cement and other hydraulically setting inorganic substances, quartz, glass, corundum, porcelain, earthenware, baryte, light spar, gypsum, talc and/or chalk and mixtures thereof are used as fillers. The inorganic fillers can be added in the form of sands, flours, or molded bodies, preferably in the form of fibers or balls. The fillers may also be present in one or all components of the multi-component mortar compound.

The proportion of fillers is preferably from 0 to 90 wt. %, for example from 10 to 90 wt. %, preferably from 15 to 75 wt. %, and more preferably from 20 to 50 wt. %, even more preferably from 25 to 30 wt. %, based on the total weight of the curing composition.

The inorganic fillers are preferably selected from the group consisting of thickeners, such as fumed silica, quartz sand, quartz powder and cement, such as aluminate cement and/or Portland cement.

The further accelerants are preferably selected from benzene alcohol, salicylic acid, styrenated phenols and cardanol.

In a further embodiment, the curing composition can contain a co-accelerator. Tertiary amines, imidazole or tertiary aminophenols, organophosphines, Lewis bases or acids such as phosphoric acid esters, or mixtures of two or more thereof, may be used as co-accelerators, for example. The co-accelerants may also be present in the epoxy resin component (A) if they are compatible with the epoxy resins.

The co-accelerants are preferably contained in the curing composition in a weight proportion of from 0.001 to 5 wt. %, based on the total weight of the curing composition.

Examples of suitable co-accelerators are in particular tris-2,4,6-dimethylaminomethylphenol, 2,4,6-tris(dimethylamino)phenol and bis[(dimethylamino)methyl]phenol. A suitable co-accelerator mixture contains 2,4,6-tris(dimethylaminomethyl)phenol and bis(dimethylaminomethyl)phenol. Mixtures of this kind are commercially available, for example as Ancamine® K54 (AirProducts, Belgium).

The present invention also relates to a multi-component epoxy resin compound, preferably a two-component epoxy resin compound comprising an epoxy resin component (A) containing at least one curable epoxy resin, and at least one curing component (B) composed as described above.

The multi-component epoxy resin compound is preferably used for construction purposes. The expression "for construction purposes" refers to the structural adhesion of concrete-concrete, steel/concrete or steel/steel or one of said materials with other mineral materials, to structural strengthening of components made of concrete, brickwork and other mineral materials, to reinforcement applications with fiber-reinforced polymers of building objects, to chemical fastening of surfaces made of concrete, steel or other mineral materials, in particular chemical fastening of construction elements and anchoring means, such as anchor rods, anchor bolts, (threaded) rods, (threaded) sleeves, reinforcing bars, screws and the like, in drilled holes in various substrates, such as (reinforced) concrete, brickwork, other mineral materials, metals (e.g. steel), ceramics, plastics, glass, and wood.

A large number of the compounds known to a person skilled in the art and commercially available for this purpose which contain on average more than one epoxide group, preferably two epoxide groups, per molecule can be used as a curable epoxide in the epoxy resin component (A), These epoxy resins may be both saturated and unsaturated as well as aliphatic, alicyclic, aromatic or heterocyclic, and may also have hydroxyl groups. They may also contain substituents which do not cause disruptive secondary reactions under the mixing or reaction conditions, for example alkyl or aryl substituents, ether groups and the like. Trimeric and tetrameric epoxies are also suitable in the context of the invention.

The epoxy resins are preferably glycidyl ethers which are derived from polyhydric alcohols, in particular from polyhydric phenols such as bisphenols and novolacs, in particular those having an average glycidyl group functionality of 1.5 or greater, in particular 2 or greater, for example from 2 to 10.

The epoxy resins can have an epoxy equivalent weight of from 120 to 2000 g/EQ, preferably from 140 to 400, in particular from 155 to 195, for example from 165 to 185. Mixtures of a plurality of epoxy resins may also be used.

Examples of the polyhydric phenols used to prepare the epoxy resins are resorcinol, hydroquinone, 2,2-bis-(4-hydroxyphenyl)propane (bisphenol A), isomer mixtures of dihydroxyphenylmethane (bisphenol F), tetrabromobisphenol A, novolacs, 4,4'-dihydroxyphenylcyclohexane and 4,4'-dihydroxy-3,3'-dimethyldiphenylpropane.

The epoxy resin is preferably a diglycidyl ether of bisphenol A or bisphenol F or a mixture thereof. Liquid diglycidyl ethers based on bisphenol A and/or F having an epoxy equivalent weight of from 180 to 190 g/EQ are particularly preferably used.

Further examples are hexanediol diglycidyl ether and/or trimethylolpropane triglycidyl ether, for example having an average molecular weight of $Mn \leq 2000$ g/mol.

The proportion of epoxy resin is >0 to 100 wt. %, preferably 10 to 70 wt. % and particularly preferably 30 to 60 wt. %, based on the total weight of the resin component (A).

In addition to the epoxy resins, the epoxy resin component (A) may optionally contain at least one reactive diluent. Glycidyl ethers of aliphatic, alicyclic or aromatic monoalcohols or in particular polyalcohols having a lower viscosity than epoxies containing aromatic groups are used as reactive diluents. Examples of reactive diluents are monoglycidyl ethers, e.g. o-cresyl glycidyl ether, and glycidyl ethers having an epoxy functionality of at least 2, such as 1,4- butanediol diglycidyl ether (BDDGE), cyclohexanedimethanol diglycidyl ether and hexanediol diglycidyl ether, as well as tri- or higher glycidyl ethers, such as glycerol triglycidyl ether, pentaerythritol tetraglycidyl ether or trimethylolpropane triglycidyl ether (TMPTGE). Mixtures of two or more of these reactive diluents may also be used, preferably mixtures containing triglycidyl ethers, particularly preferably as a mixture of 1,4-butanediol diglycidyl ether (BDDGE) and trimethylolpropane triglycidyl ether (TMPTGE).

The reactive diluents are preferably present in an amount of from 0 to 60 wt. %, in particular from 1 to 20 wt. %, based on the total weight of the resin component (A), The proportion of the epoxy component (A) in the total mass of the multi-component mortar compound is preferably 5 to 90 wt. %, in particular 20 to 80 wt. %, 30 to 70 wt. % or 40 to 60 wt. %.

Suitable epoxy resins and reactive diluents can also be found in the standard reference from Michael Dornbusch, Ulrich Christ and Rob Rasing, "Epoxidharze," Vincentz Network GmbH & Co. KG (2015), ISBN 13: 9783866308770. These compounds are included here by reference.

Furthermore, the epoxy resin component (A) can contain conventional additives, in particular adhesion promoters and fillers, as already described for the curing composition.

The adhesion promoter may be contained in an amount of up to 10 wt. %, preferably from 0.1 to 5 wt. %, based on the total weight of the epoxy resin component (A).

The proportion of fillers is preferably from 0 to 90 wt. %, for example from 10 to 90 wt. %, preferably from 15 to 75 wt. %, and more preferably from 20 to 50 wt. %, even more preferably from 25 to 30 wt. %, based on the total weight of the epoxy resin component (A).

Further conceivable additives to the multi-component mortar compound are also thixotropic agents such as optionally organically after-treated fumed silica, bentonites, alkyl- and methylcelluloses and castor oil derivatives, plasticizers such as phthalic or sebacic acid esters, stabilizers, antistatic agents, thickeners, flexibilizers, hardening catalysts, rheology aids, wetting agents, coloring additives such as dyes or pigments, for example for different staining of components for improved control of their mixing, as well as wetting agents, desensitizing agents, dispersants and other control agents for the reaction rate, or mixtures of two or more thereof.

The multi-component mortar compound is preferably present in cartridges or film pouches which are characterized in that they comprise two or more separate chambers in which the epoxy resin component (A) and the selected curing component (B) of the mortar compound are separately arranged so as to prevent a reaction.

For the use as intended, the epoxy resin component (A) and the selected curing component (B) are discharged out of the separate chambers and mixed in a suitable device, for example a static mixer or dissolver. The mixture of epoxy resin component (A) and curing component (B) is then introduced into the previously cleaned borehole by means of a known injection device. The component to be fixed is then inserted into the mortar compound and aligned. The reactive constituents of the curing component (B) react with the epoxides of the resin component (A) by polyaddition such that the mortar compound cures under environmental conditions within a desired period of time, preferably within a few minutes or hours.

Finally, the invention is directed to the use of a mixture of a polyphenol, preferably a novolac resin and/or a bisphenol, and a first and a second polyamine in a curing composition described above for detecting leaks, the curing composition visibly discoloring within a few days upon contact with atmospheric oxygen.

The discoloration is considered to be visible if the color difference ΔE of the discolored region from the original color of the composition in the CIELAB color space is more than 5 points, preferably more than 10 points. The period within which the visible discoloration occurs should not exceed 10 days, and is preferably between 4 and 10 days.

DETAILED DESCRIPTION OF PRACTICAL EXAMPLES OF THE INVENTION

Figure 1:
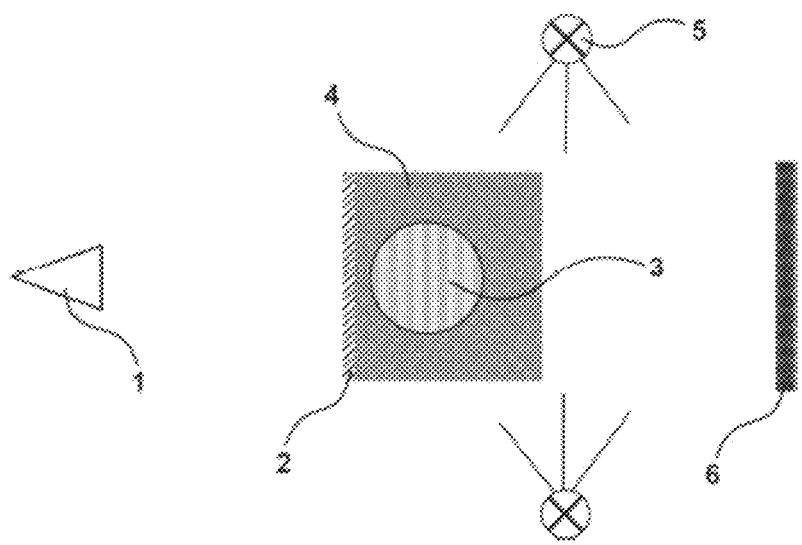
FIG. 1 is a plan view of measurement setup 1 with a background reflector.

Further advantages of the invention can be found in the following examples, which are, however, not understood to be in any way limiting.

EXAMPLES

In the examples, the abbreviations denote the following:

| | |
|---|---|
| 1,3-BAC | 1,3-bis(aminomethyl)cyclohexane, CAS number 2579-20-6, available from Mitsubishi Gas Chemicals |
| DCH | 1,2-Diaminocyclohexane, CAS number 694-83-7, available from INVISTA under the name Dytek DCH-99 |
| mXDA | m-Xylenediamine, CAS number 1477-55-0, available from Mitsubishi Gas Chemicals |
| IPDA | Isophorone diamine, CAS number 2855-13-2, available from Evonik |
| AEP | Aminoethyl piperazine, CAS number 140-31-8, available from DOW Chemicals |
| TETA | Triethylenetetramine, CAS number 112-24-3, available from DOW Chemicals |
| TEPA | Tetraethylene pentamine, CAS number 112-57-2, available from DOW Chemicals |
| SP | Styrenized phenol, CAS number 61788-44-1, available from Ruetgers under the name LS500 |
| SA | Salicylic acid, CAS number 69-72-7, available from Sigma-Aldrich |

-continued

| | |
|---|---|
| DMP | 2,4,6-tri-(dimethylamino-methyl)phenol, CAS number 90-72-2, available from AirProducts under the name DMP-30 or Ancamine K54 |
| EK | Epikure 132, a Mannich base curing composition, available from Hexion/Momentive |

A. Preparation of the Curing Compositions

All liquid components of the curing composition are mixed apart from the polyphenol component. The solid additives are then optionally added to the mixture. Finally, the polyphenol component is dissolved in the mixture with stirring.

After the polyphenol component had completely dissolved, the mixture thus obtained was poured into 10 ml rolled-rim glasses (diameter: 2.2 cm, height: 4.4 cm) and sealed with a lid so as to be airtight. Storage took place in a storage room heated to 23° C.

The formulations of the curing compositions tested in each case are summarized in Table 1 below. The measurement setup used for the color measurements described below is also indicated.

TABLE 1

Formulations of the curing compositions in wt. %

| Example | Novolac | mXDA | 1,3-BAC | DCH | AEP | SP | SA | DMP | EK | BPA | total | Measurement setup |
|---|---|---|---|---|---|---|---|---|---|---|---|---|
| E1 | 20 | 80 | | | | | | | | | 100 | 1 |
| E2 | 20 | | 80 | | | | | | | | 100 | 1 |
| E3 | 20 | | | 80 | | | | | | | 100 | 1 |
| E4 | 20 | 24 | 56 | | | | | | | | 100 | 1 |
| E5 | 20 | 52 | | 28 | | | | | | | 100 | 1 |
| E6 | 20 | | 56 | 24 | | | | | | | 100 | 1 |
| E7 | 20 | 20 | 49 | 11 | | | | | | | 100 | 1 |
| E8 | 20 | 24 | 56 | | | | | | | | 100 | 2 |
| E9 | 20 | | | 40 | 40 | | | | | | 100 | 2 |
| E10 | 20 | | 61 | 14 | 5 | | | | | | 100 | 2 |
| E11 | 20 | | 61 | 14 | | 5 | | | | | 100 | 2 |
| E12 | 20 | | 61 | 14 | | | 5 | | | | 100 | 2 |
| E13 | 20 | | 61 | 14 | | | | 5 | | | 100 | 2 |
| E14 | 20* | | 70 | 10 | | | | | | | 100 | 2 |
| E18 | | | 50 | 10 | | | | 40 | | | 100 | 2 |
| E15 | | | 80 | 10 | | | | | | 10 | 100 | 2 |
| E16 | | 90 | | | | | | | | 10 | 100 | 2 |
| E19 | | | 50 | | | | | | 50 | | 100 | 2 |
| E17 | | | 82 | 18 | | | | | | | 100 | 2 |

B. Color Measurements

Measurement Setup

The ColorCatcher® system from Techkon GmbH was used for the color measurements. This system allows color-binding measurements to be carried out using the camera of a commercially available smartphone and suitable software in conjunction with a calibration color chart (ColorChart). The calibration color chart contains different color ranges as a reference and a cut-out that allows a view of a portion of the object placed under the chart.

To carry out a measurement, the chart is placed on the object to be measured and a photo is taken using the software ("app") installed on the smartphone, which photo covers at least the entire region of the calibration color chart. The measured values in the desired color system are then shown on the display of the mobile device. An iPhone 6 was used for the measurements.

Figure 2:
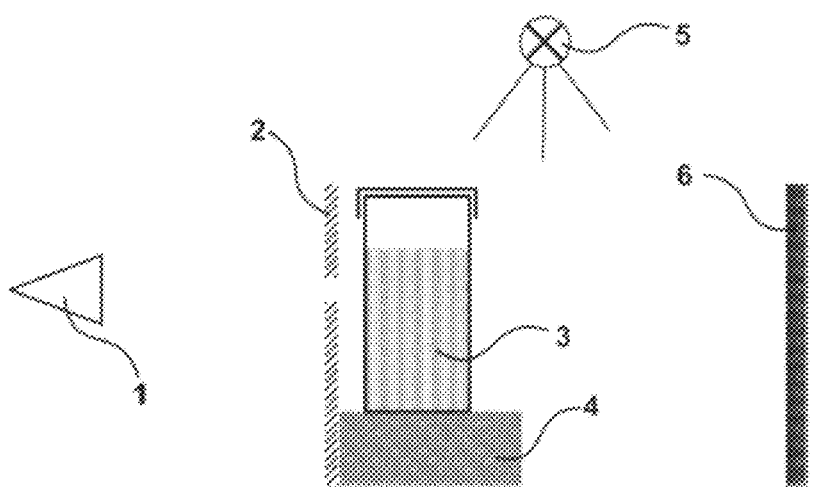
FIG. 2 is a side view of the measurement setup of FIG. 1.

FIG. 1 to 4 show the measurement setups 1 and 2 used for the measurements. FIG. 1 is a plan view of measurement setup 1 with a background reflector. FIG. 2 is a side view of the same measurement setup with a background reflector.

Figure 3:
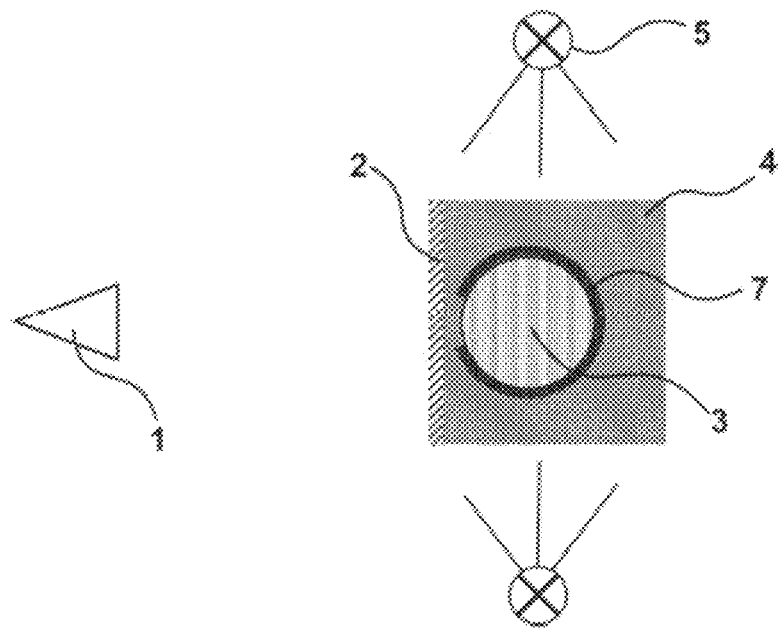
FIG. 3 is a plan view of a simplified measurement setup 2 for color measurement with a diffuser.
Figure 4:
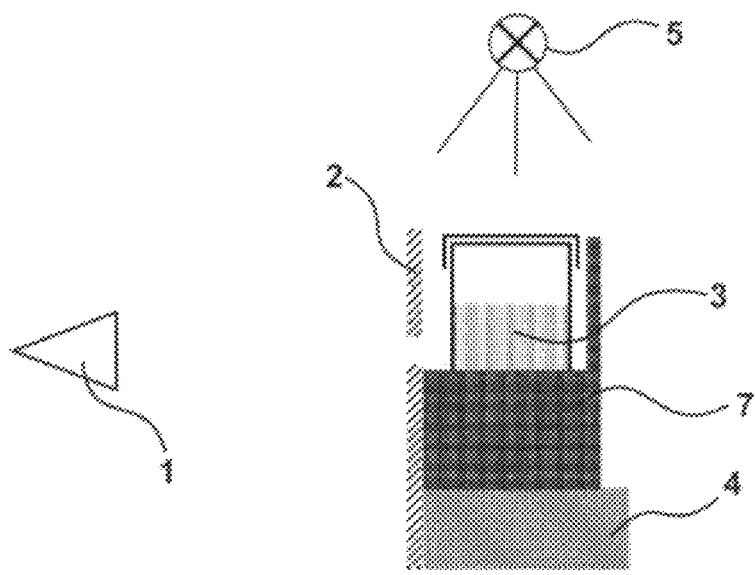
FIG. 4 is a side view of the measurement setup of FIG. 2.

FIG. 3 is a plan view of a simplified measurement setup 2 with a diffuser around the measuring container. FIG. 4 is a side view of the same simplified measurement setup 2 with a diffuser around the measuring container.

In FIG. 1 to 4, the reference signs denote the following:
1: Smartphone with ColorCatcher software installed
2: ColorChart calibration color chart
3: Rolled-rim glass with curing agent mixture
4: Base
5: Light source
6: Light reflector (white cardboard)
7: Light diffuser (white sheet of paper 80 g/m$^2$)

An HFB RB500 DL lighting device (Kaiser Fototechnik GmbH & Co. KG; item number 5556) is used as the light source (5), which device is equipped with two Dulux L 36 W/12-950 daylight fluorescent tubes (Osram).

Figure 5:
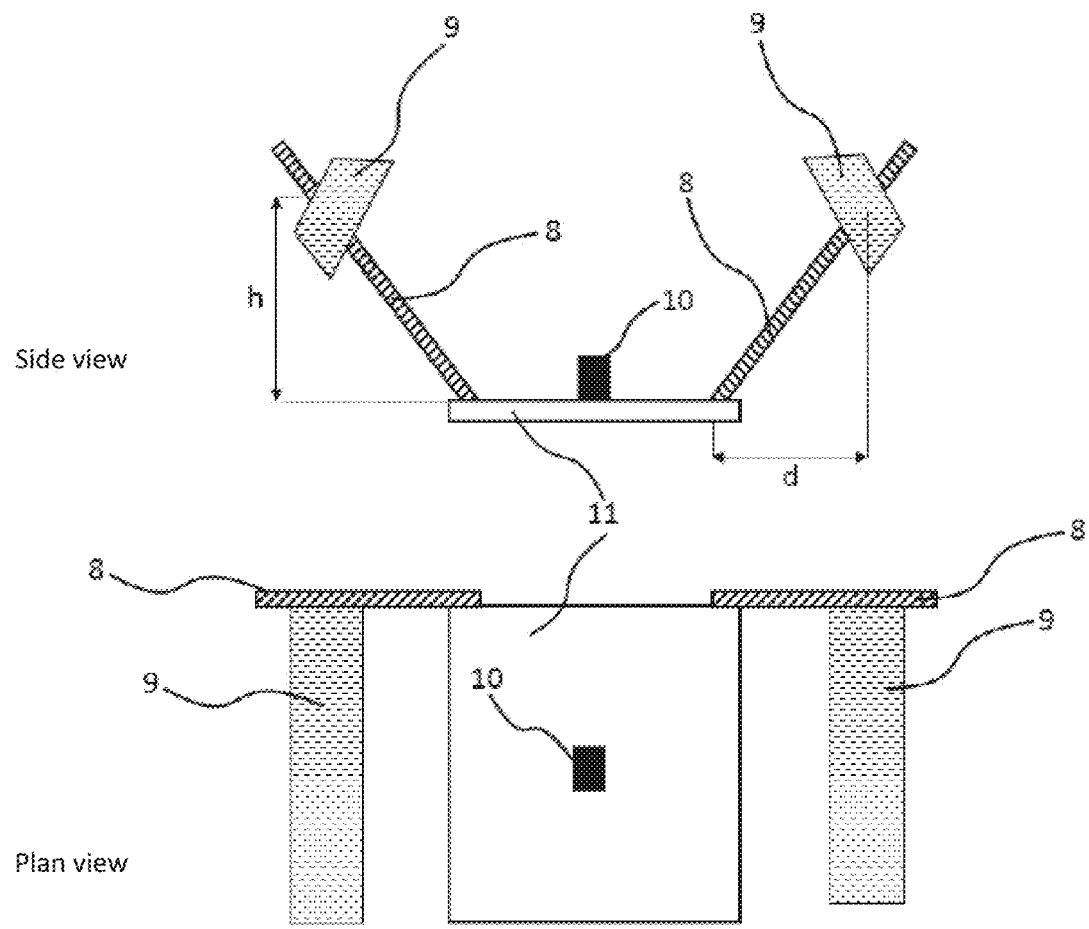
FIG. 5 shows the position of the lamps in measurement setup 1 in a side view (top) and a top view (bottom)

FIG. 5 shows the arrangement of the light source in relation to the measurement setup.

The soft boxes (9) fastened to the two tripod arms (8) are aligned with the centrally positioned measuring setup (10). The tripod arms provided with clamp holders are attached and positioned at the rear end of a base plate measuring 50 cm×45 cm in such a way that the two soft boxes are at a height h of 35 cm and a distance d of 22 cm.

Measurement Method and Color Space

As part of the color measurement, the colors of the respective curing compositions are determined and displayed in the CIELAB color space. The CIELAB color model is based on the normal spectral value functions that were determined by reference experiments with a large number of normal-sighted test subjects.

The CIELAB color space thus takes the color perception of the human eye into account and is therefore particularly suitable for drawing conclusions regarding the perceptibility of a change in color. It is also a widely used method in the graphics industry (for the normal spectral function see E. Lübbe: Farbempfindung, Farbbeschreibung und Farbmessung (Color perception, color description and color measurement), Springer Vieweg 2013, p. 22ff; for the CIELAB color space, see E. Lübbe: Farbempfindung, Farbbeschreibung und Farbmessung, Springer Vieweg 2013, p. 86ff).

The CIELAB color space is spanned by the three axes L*, a* and b*, where
L* represents the luminance axis
a* represents the green-red axis
b* represents the blue-yellow axis.

These three coordinates can be used to describe a color location in the CIELAB color space.

The color difference ΔE of two colors in the CIELAB color space can be calculated using the following formula:

$$\Delta E = \sqrt{\Delta L^{*2} + \Delta a^{*2} + \Delta b^{-2}} \Delta$$

where ΔL* represents the difference between the luminance values of the two colors, Δa* represents the difference between the two green-red values and Δb* represents the difference between the two blue-yellow values (cf. E. Lübbe: Farbempfindung, Farbbeschreibung und Farbmessung, Springer Vieweg 2013, p. 131).

The greater the value of ΔE, the greater the perceived color difference, which is why the ΔE value is used in the following tests as a measure of the visible change in color.

Practical Implementation of Color Measurements

The rolled-rim glass with the curing composition to be measured is brought into the measuring position in the relevant measuring setup. After switching on the illumination, the ColorCatcher application installed on the smartphone is started and a color measurement is carried out according to the instructions.

For each rolled-rim glass, three color measurements are carried out in succession and then the arithmetic mean of the values obtained for L*, a* and b* is calculated.

Color Measurement Results

Measurement Series 1: Discoloration Upon Contact with Atmospheric Oxygen

Two curing compositions according to the invention according to Examples E6 and E7 were each poured into two 10 mL rolled-rim glasses (diameter: 2.2 cm, height 4.4: cm), closed with a lid and stored in a room illuminated with daylight at 23° C., The glasses were each only approximately 70% filled to ensure an excess of air.

A rolled-rim glass filled with a curing composition was shaken manually once a day and then opened for 20 seconds to allow atmospheric oxygen to enter. The comparative samples remained closed and were only shaken once a day during this time.

On the day of production and after 1, 4, 8, 13 and 15 days, color measurements were carried out on all four samples using measurement setup 1.

The results of measurement series 1 shown in FIG. 5 show that the curing compositions according to the invention discolor only upon contact with atmospheric oxygen. A clear difference in the ΔE values of the aerated samples E6 and E7 compared with the non-aerated samples can be seen after only four days. The unaerated samples of Examples E6 and E7 show no significant change in color even after 15 days.

Since the discoloration of the curing compositions according to the invention occurs only upon contact with (atmospheric) oxygen, it is ensured that the discoloration in curing compositions packaged in the customary manner only occurs at defect sites, such as cracks in the packaging.

Measurement Series 2: Discoloration Compared to Reference Compositions

Curing compositions according to Examples E1 to E5 (reference) and E6 and E7 (according to the invention) were poured into 10 mL rolled-rim glasses (diameter: 2.2 cm, height: 4.4 cm), closed with a lid and stored in a room illuminated with daylight at 23° C. The glasses were each only approximately 70% filled to ensure an excess of air.

The rolled-rim glasses were shaken manually once a day and then opened for 20 seconds to allow atmospheric oxygen to enter.

On the day of production and after 1, 4 and 11 days, color measurements were carried out on all samples using measurement setup 1.

Figure 6:
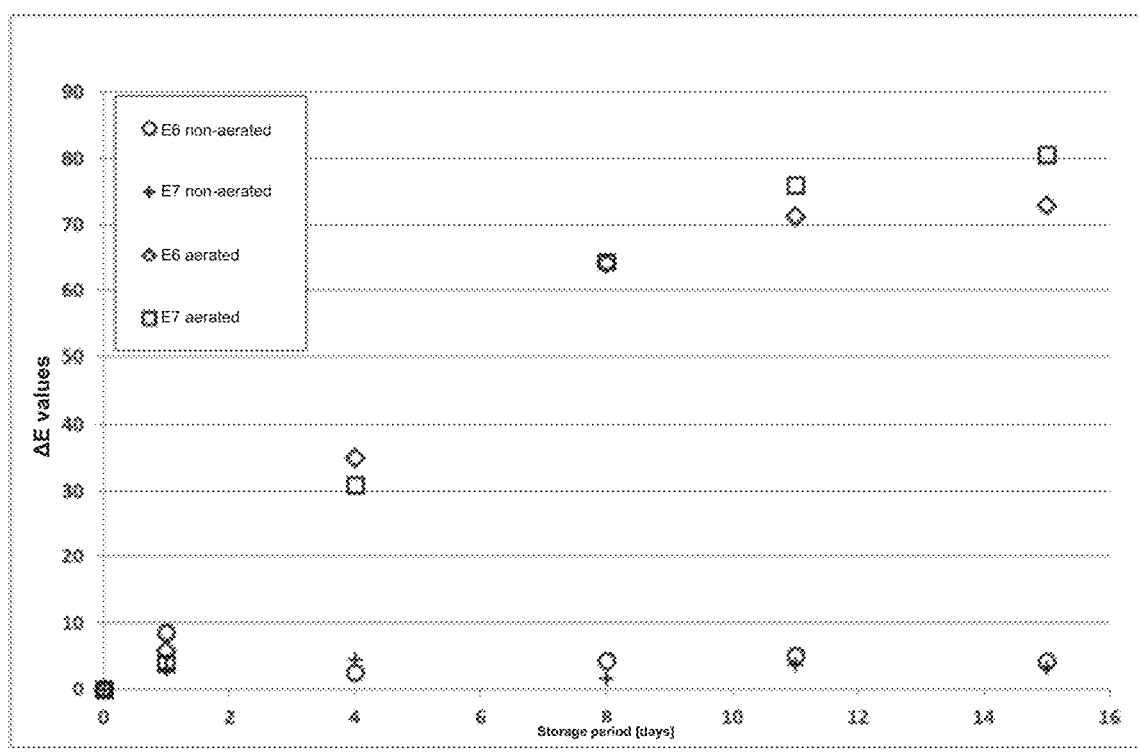
FIG. 6 is a diagram of the results of measurement series 1.

The results of measurement series 2 are shown in a diagram in FIG. 6. The color measurements of the measurement series 2 show that the curing compositions E6 and E7 according to the invention already demonstrate a significantly stronger, visible discoloration after 4 days than the reference mixtures E1 to E5. After only four days, the ΔE values of the reference compositions are only about 30% of the ΔE values of samples E6 and E7 according to the invention.

Measurement Series 3: Replacement of 1,3-BAC with AEP

Curing compositions according to Examples E8 (reference) and E9 (according to the invention) were poured into 10 mL rolled-rim glasses (diameter: 2.2 cm, height: 4.4 cm), closed with a lid and stored in a room illuminated with daylight at 23° C. The glasses were each only approximately 70% filled to ensure an excess of air. The rolled-rim glasses were shaken manually once a day and then opened for 20 seconds to allow atmospheric oxygen to enter.

On the day of production and then again after 2, 8 and 8 days, color measurements were carried out on all samples using measurement setup 2.

Figure 7:
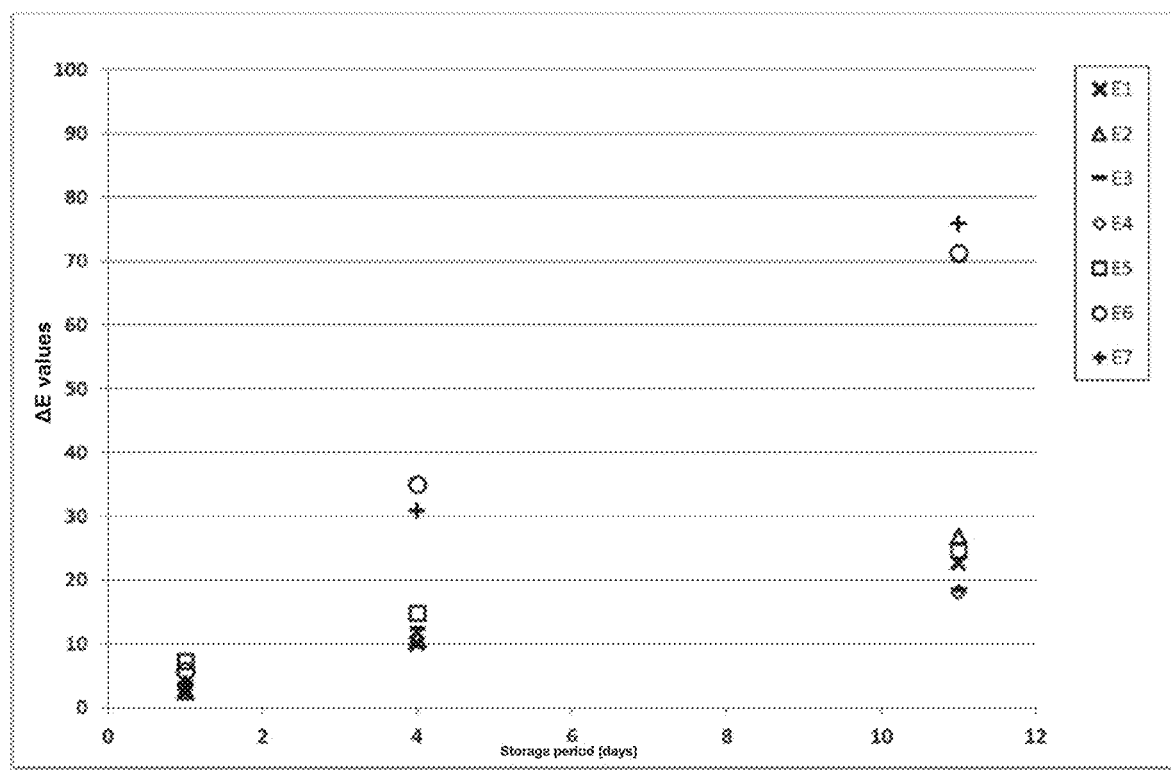
FIG. 7 is a diagram of the results of measurement series 2.

The results of measurement series 3 are shown in a diagram in FIG. 7. The curing composition according to the invention from Example E9 contains the compound AEP as the second polyamine instead of 1,3-BAC, This curing composition also exhibits a stronger discoloration after 2 days than the reference composition E8, the ΔE value of the reference composition hardly changing after 2 days and being only approximately 20% of the ΔE value of the composition according to the invention E9 after 8 days.

Even a curing composition in which DCH is used as the first polyamine and AEP as the second polyamine thus shows the desired clear change in color, while the reference composition E8 does not achieve an unusually significant change in color in the same period. The measurement series 3 shown in FIG. 7 thus shows that both the amine AEP and the amine 1,3-BAC can be used as the second polyamine in a curing composition according to the invention.

Measurement Series 4: Change in Color when Additives are Added

Curing compositions according to Examples E8 (reference) and E10 to E13 (according to the invention) were each poured into 10 ml rolled-rim glasses (diameter: 2.2 cm, height: 4.4 cm), closed with a lid and stored in a room illuminated with daylight at 23° C. The glasses were each only approximately 70% filled to ensure an excess of air. The rolled-rim glasses were shaken manually once a day and then opened for 20 seconds to allow atmospheric oxygen to enter.

Figure 8:
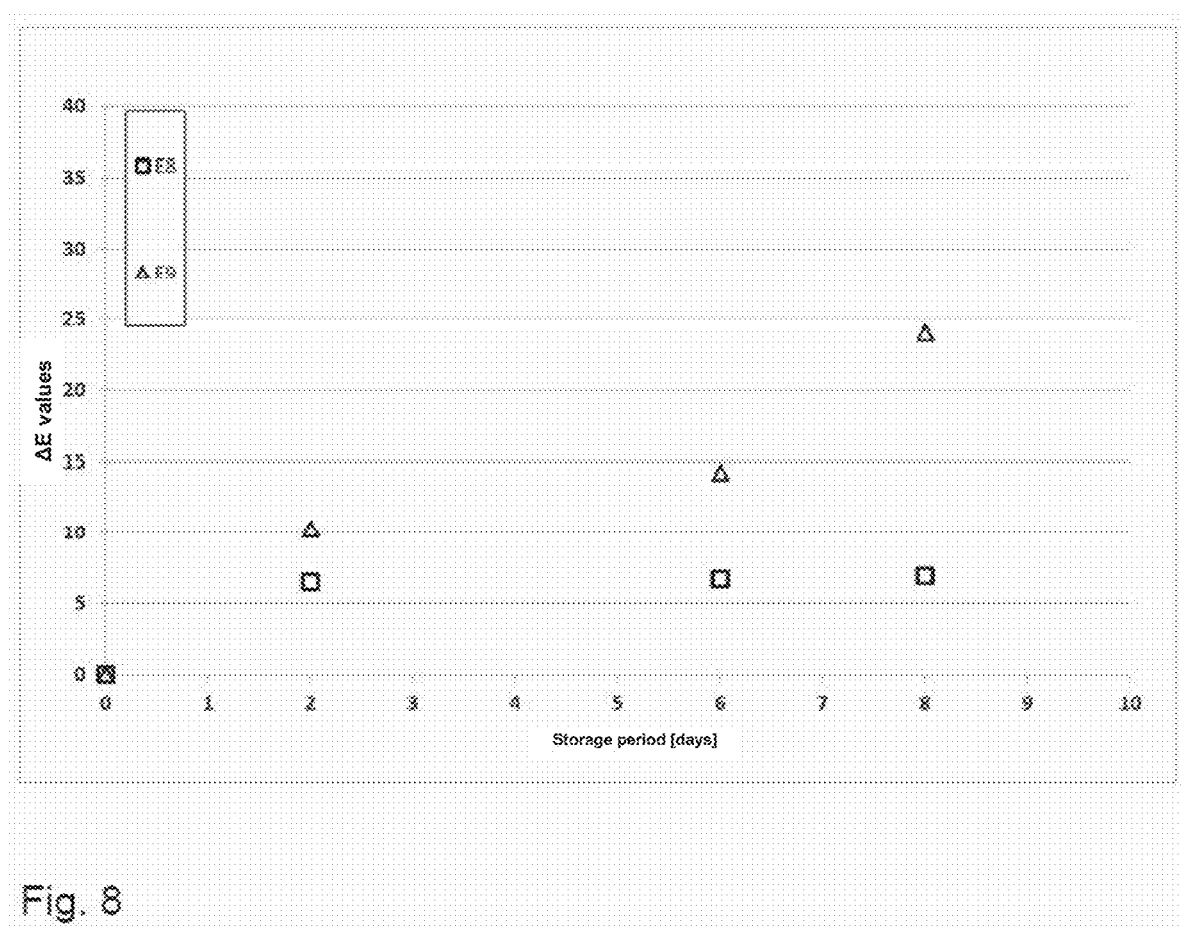
FIG. 8 is a diagram of the results of measurement series 3.

On the day of production and then again after 2, 6 and 8 days, color measurements were carried out on all samples using measurement setup 2. The results of measurement series 4 are shown in a diagram in FIG. 8.

The results of the color measurements show that the curing compositions E10 to E13 according to the invention also exhibit a clear change in color when a combination of 1,3-BAC and AEP is used as the second polyamine (Example E10) and/or when further additives are added, which are typically used in curing compositions for epoxy compounds. Such additives are, for example, a combination of phenol with tertiary amines (DMP-30, Example E11), salicylic acid (Example E12) and styrenized phenol (Example E13). The ΔE value of the reference composition hardly changes after 2 days and is only about 20% of the ΔE value of the compositions according to the invention after 6 days at the latest.

Measurement Series 5: Use of Further Polyphenols

Curing compositions according to Examples E14 and E15 (according to the invention) and compositions according to Examples E16 and E17 (reference) were poured into 10 ml rolled-rim glasses (diameter: 2.2 cm, height: 4.4 cm), closed with a lid and stored in a room illuminated with daylight at 23° C. The glasses were each only approximately 70% filled to ensure an excess of air. The rolled-rim glasses were shaken manually once a day and then opened for 20 seconds to allow atmospheric oxygen to enter.

Figure 9:
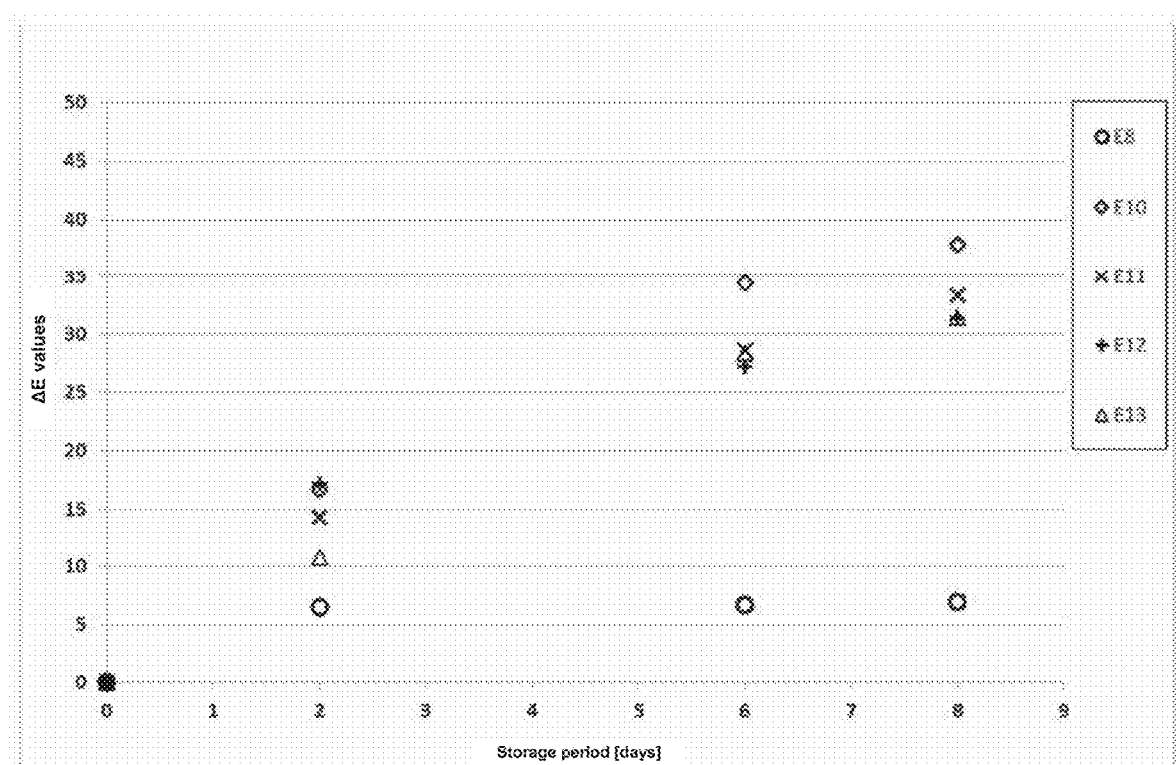
FIG. 9 is a diagram of the results of measurement series 4.

On the day of production and then again after 1, 2, 4 and 8 days, color measurements were carried out on all samples using measurement setup 2. The results of measurement series 5 are shown in a diagram in FIG. 9.

The composition according to Example E14 contains the Novolac Supraplast 3616 from SWC and the composition according to Example E15 contains bisphenol A as a polyphenol. After only a few days, the two compositions demonstrate a significantly greater discoloration than the two reference compositions E16 and E17. The ΔE value of the reference compositions is below 5 even after 8 days, while the ΔE values of the compositions according to the invention are already above 10 after 2 days and well above 20-30 after 8 days.

The reference composition E16 that is not according to the invention contains a mixture of a polyphenol (bisphenol A) according to the invention and the polyamine mXDA that is not according to the invention. The reference composition E17 that is not according to the invention contains the combination of polyamines 1 and 2 used according to the invention, but not polyphenol. It can be seen from measurement series 5 that a clear color change can also be achieved in the curing compositions according to the invention with polyphenols other than novolac upon contact with atmospheric oxygen.

Measurement Series 6: Use of Further Polyphenols

Curing compositions according to Example E18 (according to the invention) and Examples E16 and E19 (reference) were poured into 10 mL rolled-rim glasses (diameter: 2.2 cm, height: 4.4 cm), closed with a lid and stored in a room illuminated with daylight at 23° C., The glasses are each only approximately 70% filled to ensure an excess of air. The rolled-rim glasses were shaken manually once a day and then opened for 20 seconds to allow atmospheric oxygen to enter.

Figure 10:
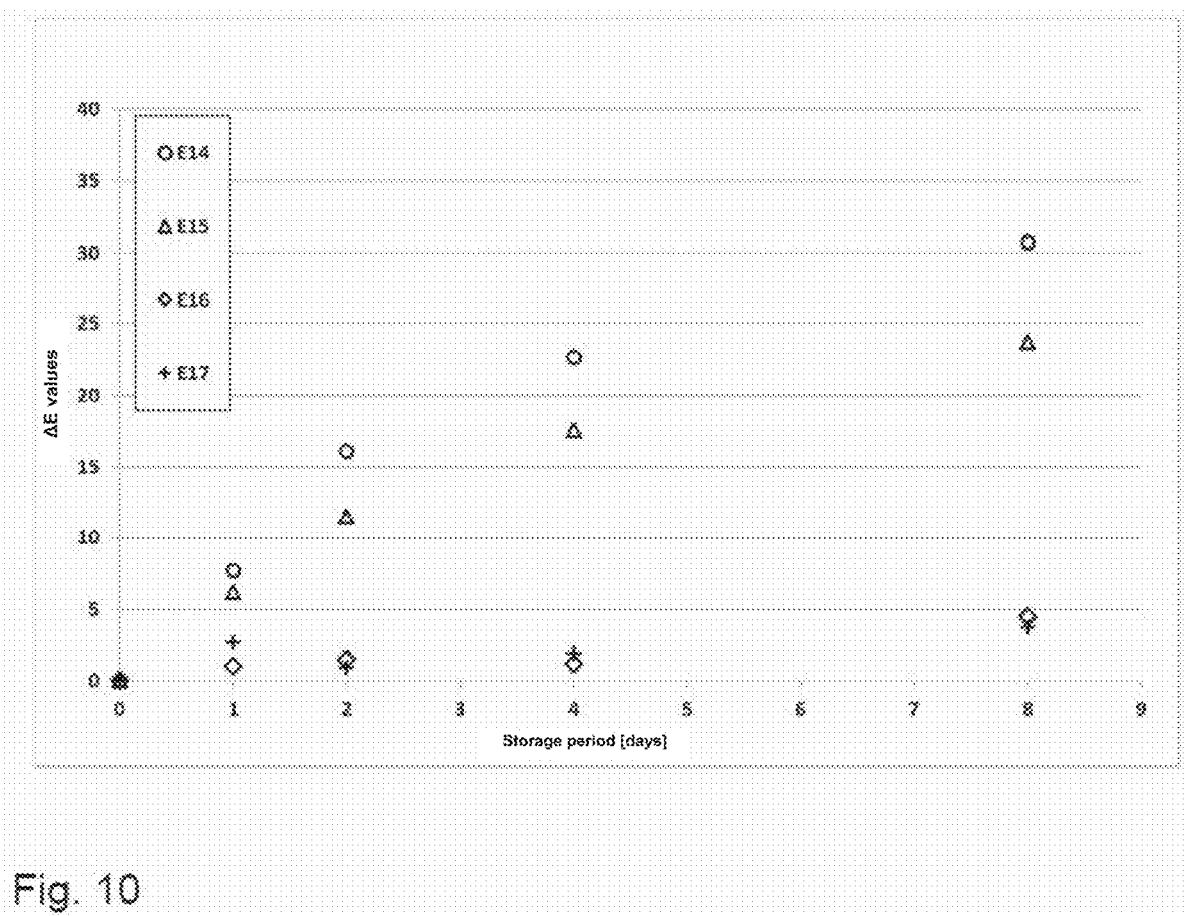
FIG. 10 is a diagram of the results of measurement series 5.
Figure 11:
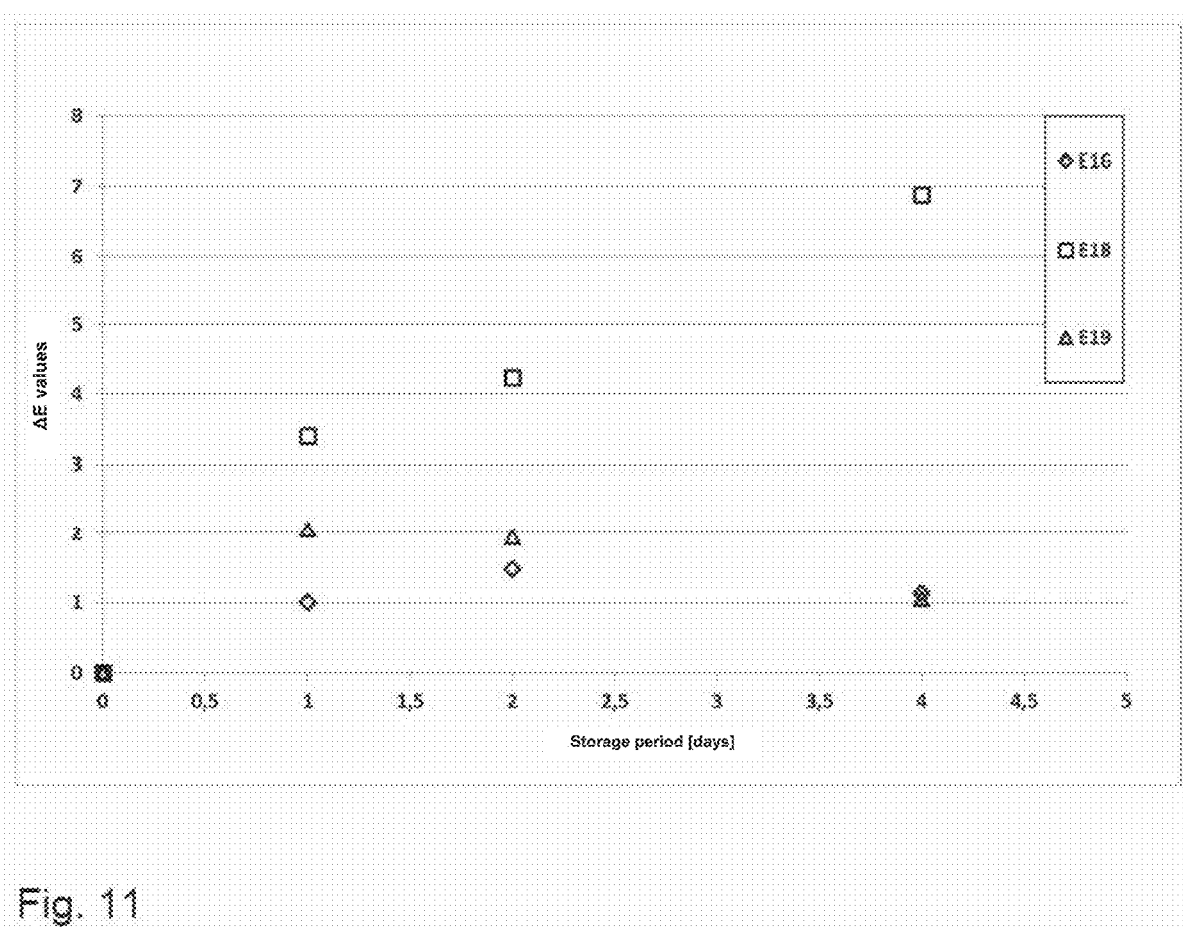
FIG. 11 is a diagram of the results of measurement series 6.

On the day of production and then again after 1, 2 and 4 days, color measurements were carried out on all samples using measurement setup 2. The results of measurement series 6 are shown in a diagram in FIG. 10.

The curing composition according to Example E18 contains a mixture of Epikure 132 and the two polyamines 1,3-BAC and DCH used according to the invention. Epikure 132 is a Mannich base from the amine mXDA and bisphenol A that is dissolved in excess mXDA, The Mannich base has another two phenolic groups and is therefore a polyphenol according to the invention. In addition, there is still a residual content of free bisphenol A in the commercially available product Epikure 132, The reference composition according to Example 16 contains the Mannich base Epikure 132 and the amine mXDA. The reference composition according to Example 19 contains the Mannich base Epikure 132 and the polyamine 1,3-BAC, but no compound from the group of the first polyamines.

As expected, the curing composition according to Example 18 shows a clear change in color when atmospheric oxygen is admitted, while the two reference compositions E16 and E19 do not show the desired clear change in color. The ΔE values of the reference compositions E16 and E19 do not rise above the value 2 even after 8 days, while the ΔE value of the composition E18 according to the invention is already approximately 7 after 4 days.

The measurement series 6 confirms that polyphenols other than novolac can also be used in the curing compositions according to the invention.

C. Production of Epoxy Mortar Compounds and Measurement of Bond Strength

The curing compositions according to Examples E1, E2, E4, E6, E11 and E18 were filled with inorganic additives in accordance with Table 2 below and mixed as curing component B in a stoichiometrically correct ratio with an epoxy resin mixture (component A) likewise containing fillers. The composition of the epoxy resin compound prepared in this way is given in Table 3 below.

The thus produced components of the mortar compound were stirred in a dissolver (PC laboratory system, volume 1 L) for 10 minutes under a vacuum at 3500 rpm.

In Examples 1 to 3, the bisphenol A-based and bisphenol F-based epoxy resins commercially available under the names DER 330 and DER 354 (Dow Europe), respectively, were used as the epoxy resins.

The adhesion promoter was 3-glycidyloxypropyl-trimethoxysysilane, available under the name Dynalsylan GLYMO™ (Evonik Industries).

1,4-Butanediol-diglycidyl ether and trimethyolpropane-triglycidyl ether, commercially available under the names Epilox P 13-21 (Leunaharze) and Araldite™ DY-T (Huntsman), respectively, were used as reactive diluents.

A mixture available under the trade name Millisil™ W12 from the Quarzwerke Frechen was used as filler, which mixture contains quartz powder and optionally aluminate cement. The fumed silica used as a thickener is commercially available from Cabot Rheinfelden under the name Cab-O-Sil™ TS-720.

The bond strength or failure load was determined by centric pull-out tests of three anchor rods per mortar compound. Anchor rods M12 with a seating depth of 72 mm and a borehole diameter of 14 mm were used. The boreholes were drilled using a Hilti TE-40 combihammer, A TE-CX 14 mm drill was used as the drill. The boreholes were cleaned with a wire brush and compressed-air lance (8 bar). The concrete used had strength class C20/25. The curing time was 24 hours at 23° C. The bond strength of the mortar compounds determined by the pull-out tests is shown in Table 4 below.

The pull-out tests were carried out in the same way as in the "European Organization for Technical Approvals" (EOTA) (2001): ETAG No 001, November 2008 edition: European Technical Approval Guidelines for metal anchors for anchoring in concrete, Part 5: bonded anchors, February 2008, conditions described under 5.1.2.1 (b), where the concrete compressive strength of the concrete used for the pull-out tests is 30.9 MPa.

TABLE 2

Composition of the curing component B

| Curing composition | Wt. % |
|---|---|
| Amines/polyphenol | 61.5 |
| Fillers | 35 |
| Fumed silica (hydrophobic) | 3.5 |

TABLE 3

Composition of the epoxy resin component A

| Resin component composition | Wt. % |
|---|---|
| 3-Glycidyloxypropyltrimethoxysilane | 2.5 |
| Bisphenol A-based epoxy resin | 30 |
| Bisphenol F-based epoxy resin | 17 |
| 1,4-butanediol diglycidyl ether | 6 |
| Trimethylolpropane triglycidyl ether | 6 |
| Quartz powder | 36 |
| Fumed silica (hydrophobic) | 2.5 |

TABLE 4

Average failure load of the mortar compounds according to the invention

| Curing component | Bond strength [N/mm$^2$] |
|---|---|
| E1 | 36.9 |
| E2 | 37.8 |
| E4 | 38.0 |
| E6 | 36.8 |
| E11 | 37.6 |
| E18 | 37.8 |

The results show that the bond strength of the mortar compounds produced with the curing compositions E6, E11 and E18 according to the invention are comparable to those using the reference compositions E1, E2 and E4 that are not according to the invention. All values are in the bond strength level to be expected for mortar compounds based on epoxy resins. The curing compositions according to the invention are therefore suitable for use in mortar compounds for chemical fasteners.

The invention claimed is:

1. A curing composition for a multi-component epoxy resin compound, comprising:
   5 to 20 wt. % of at least one first polyamine,
   15 to 50 wt. % of at least one second polyamine, and
   from 1 to 40 wt. % of at least one polyphenol selected from the group consisting of bisphenols,
   wt. % being based on the weight of organic parts of the curing composition,
   wherein the at least one first polyamine corresponds to the following general formula (I):

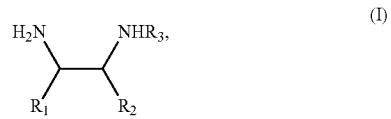
(I)

in which
R$_1$ and R$_2$ denote, independently of one another, —H or —CH$_3$, or together denote an optionally substituted C$_3$ to C$_8$ hydrocarbon chain which is connected to form a cycle, and R$_3$ denotes —H, —CH$_3$, —CH$_2$—CH$_2$—NH$_2$ or —CH$_2$—CH$_2$—NH—CH$_2$—CH$_2$—NH$_2$, and wherein the at least one second polyamine corresponds to the following general formula (II) or (III):

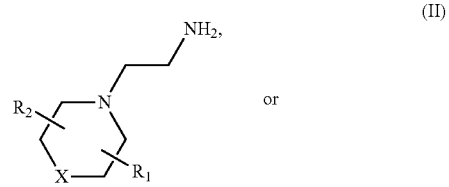
(II)

or

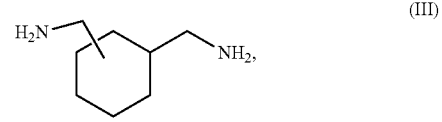
(III)

in which
R$_1$ and R$_2$ denote, independently of one another, H or —CH$_3$, and
X denotes NH, O or S.

2. The curing composition according to claim 1, wherein the at least one first polyamine is selected from the group consisting of 1,2-diaminocyclohexane, 1,2-diaminocyclohexene, diethylenetriamine, triethylenetetramine, and mixtures thereof.

3. The curing composition according to claim 1, wherein the at least one second polyamine is selected from the group consisting of 1,3-bis(aminomethyl)cyclohexane, aminoethylpiperazine, and mixtures thereof.

4. The curing composition according to claim 1, wherein the at least one polyphenol further comprises a novolac resin which corresponds to the following formula (IV):

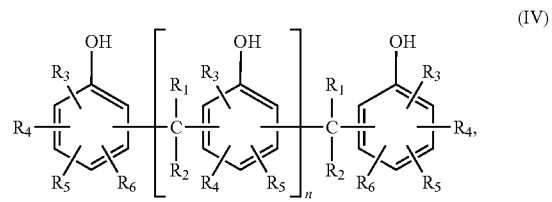
(IV)

in which
R$_1$ and R$_2$ each denotes, independently of one another, H or —CH$_3$;
R$_3$, R$_4$, R$_5$ and R$_6$ each denotes, independently of one another, H, —CH$_3$ or an aliphatic functional group; and
n is 0 to 20.

5. The curing composition according to claim 1, wherein the at least one polyphenol further comprises a novolac resin which corresponds to the following formula (V):

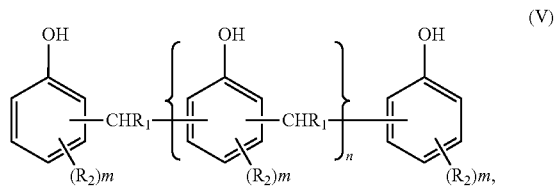
(V)

in which
R$_1$ denotes H,
R$_2$ denotes C$_1$ to C$_{10}$ alkyl,
m is 0, 1 or 2, and
n is 0 to 20.

6. The curing composition according to claim 1, wherein the at least one polyphenol comprises a bisphenol from the group consisting of bisphenol A, bisphenol F, and mixtures thereof.

7. The curing composition according to claim 1, wherein the curing composition further comprises:
    additional monoamines and/or polyamines, and/or
    a curing agent for epoxy resins selected from the group consisting of Mannich bases, polyamidoamines, phenalkamines, and mixtures thereof.

8. The curing composition according to claim 1, wherein the curing composition further comprises:
    an additive selected from the group consisting of diluents, solvents, accelerants, silanes, thickeners, inorganic tillers, and mixtures thereof.

9. A multi-component epoxy resin compound comprising:
    an epoxy resin component (A) containing at least one curable epoxy resin and optionally a reactive diluent,
    at least one curing component (B) comprising the curing composition according to claim 1,
    wherein the epoxy resin component and the at least one curing component are separate from one another.

10. The multi-component epoxy resin compound according to claim 9, further comprising:
    an additive selected from the group consisting of co-accelerants, adhesion promoters, reactive diluents, thickeners, fillers, and mixtures thereof.

11. A method for detecting leaks, comprising:
    detecting discoloration of a mixture of a polyphenol and a first and a second polyamine in the curing composition according to claim 1,
    wherein the curing composition visibly discolors within 10 days upon contact with atmospheric oxygen.

12. The curing composition according to claim 1, wherein said polyphenol further comprises a novolac resin as an accelerator.

* * * * *